Dec. 27, 1932.     W. C. NABORS     1,892,072
VEHICLE COUPLING
Filed June 5, 1931     2 Sheets-Sheet 1

Inventor
William C. Nabors,
By Hardway Mathey
Attorneys

Dec. 27, 1932.  W. C. NABORS  1,892,072
VEHICLE COUPLING
Filed June 5, 1931   2 Sheets-Sheet 2

Inventor
William C. Nabors
By Hardway Lathey
Attorneys

Patented Dec. 27, 1932

1,892,072

UNITED STATES PATENT OFFICE

WILLIAM C. NABORS, OF MANSFIELD, LOUISIANA

VEHICLE COUPLING

Application filed June 5, 1931. Serial No. 542,333.

This invention relates to a novel type of vehicle and has particular relation to coupling means whereby the trailer may be connected to and released from a truck or tractor.

One object of the invention is to provide means whereby the tractor may be automatically coupled to the trailer, said coupling means being of such construction that the trailer may be readily uncoupled from the draft vehicle.

Another object of the invention resides in the provision of cooperating coupling members, one mounted on the rear end of the draft vehicle and the other on the forward end of the trailer, said coupling members being so shaped that they may be readily brought into coupling relation and being equipped with means for automatically coupling said members together to connect the trailer with the tractor and having manually operable means for uncoupling said members to effect the detachment of the trailer from the draft vehicle. This application discloses certain improvements over the disclosure of my pending application on load carrying vehicle, filed December 30, 1930, Serial No. 505,528 and broadly claimed in said copending application, this application being confined to certain improvements not disclosed in said copending application.

With the above and other objects in view, this inventon has particular relation to certain novel features of construction, operation and arrangement of parts, an example of which is given in this specification and illustrated in the accompanying drawings, wherein:—

Figure 1:
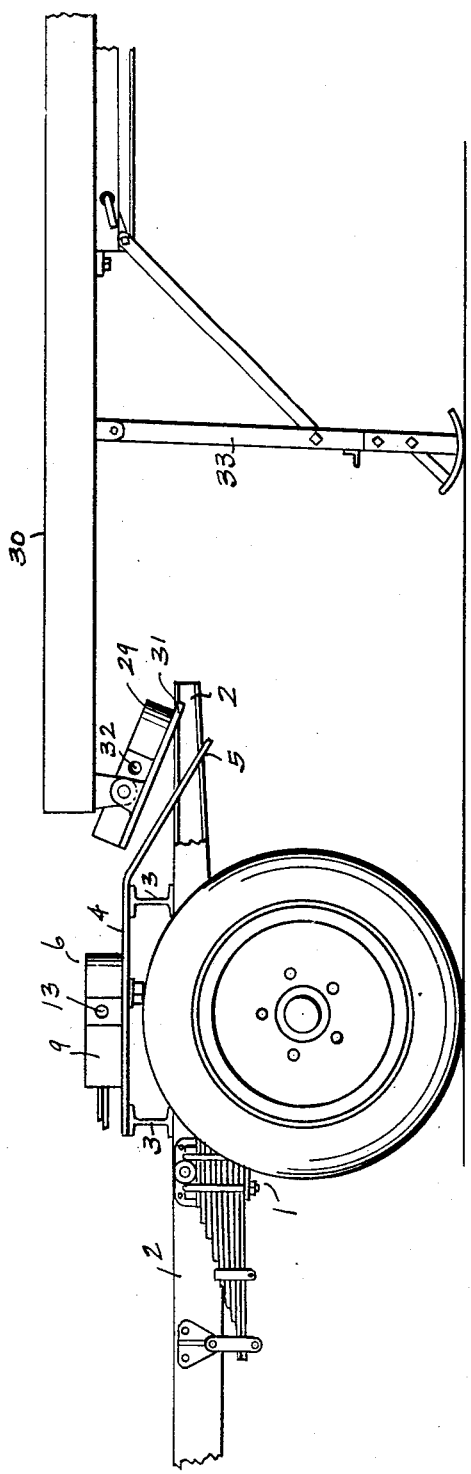
Figure 1 shows a fragmentary side elevation of a draft vehicle and trailer shown in position for coupling them together.
Figure 2:
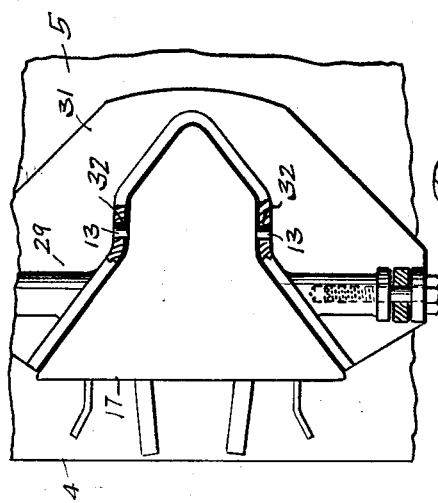
Figure 2 shows a fragmentary plan view, partly in section, of the coupling members and associated parts coupled together.
Figure 3:
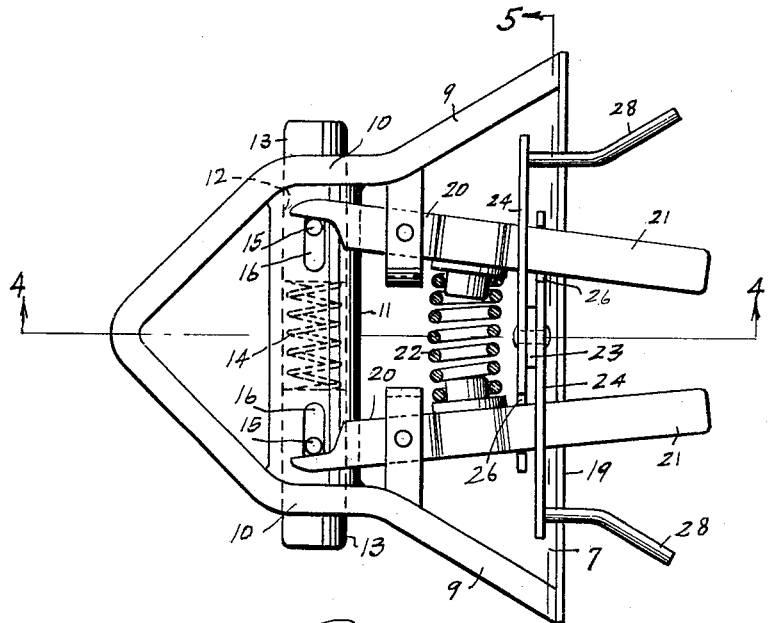
Figure 3 shows a plan view partly in section of the tractor coupling member showing the cover plate removed.
Figure 4:
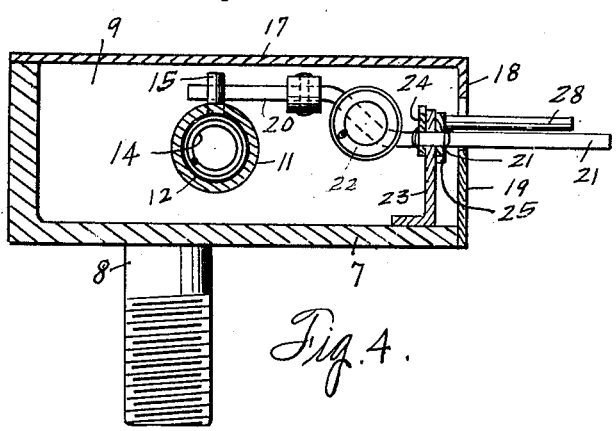
Figure 4 shows a longitudinal sectional view thereof taken on the line 4—4 of Figure 3.
Figure 5:
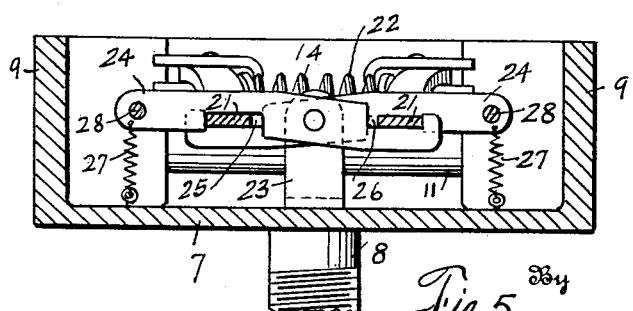
Figure 5 shows a cross sectional view taken on the line 5—5 of Figure 3.

Referring now more particularly to the drawings wherein like numerals of reference designate similar parts in each of the figures, the numeral 1 designates the tractor as a whole having the frame work which includes the side members 2, 2. Mounted on the rear end of this framework are transverse beams 3, 3, preferably I-beams, which are spaced apart and on these beams there is a supporting plate 4 whose rear end declines rearwardly forming the guide apron 5. Mounted on the horizontal portion of the plate 4 there is a coupling member designated generally by the numeral 6. This coupling member has the bottom bearing plate 7 which rides upon the plate 4 and which is pivoted, adjacent its rear end, to the supporting plate 4 by means of a suitable depending bolt 8 through the plate 4 which is retained in place by a conventional nut threaded onto the lower end thereof. Said coupling 6 is thereby mounted to pivot about a vertical axis. The bottom bearing plate 7 may be of a substantially triangular shape with its pivoted apex pointed rearwardly and the side margins of this plate have the upstanding marginal side flanges 9, 9 whose mid-portions 10, 10 are turned into substantially parallel relation. There is a transverse tubular bearing member 11 between and anchored to said parallel portions 10 and mounted in opposite ends of said bearing member there are the dogs 13, 13 whose inner ends work against a coil spring 14 in the bearing 12 and located between said dogs. Each dog 13 has an upstanding stud 15 attached thereto and working through a corresponding lengthwise slot 16 in said bearing member 11. The bearing 12 through the member 11 continues on through the parallel side portions, 10.

A cover plate 17 rests on the upper margins of the side flanges and its front margin has the downwardly turned flange 18 and spaced beneath this downwardly turned flange 18 there is an upstanding front cover 19 thus forming an enclosed housing for the operating mechanism of the coupling member 6.

Pivotally mounted in this housing there are the oppositely disposed levers 20 whose inner ends engage the outsides of the respective upstanding studs 15. The outer ends of these levers are extended through the slot between the flange 18 and the front cover 19 thus forming the operating handles 21, 21, and between these handles there is the coil pressure spring 22.

Upstanding from the bottom plate adjacent the front wall of said housing there is a support 23 on which there is pivotally mounted the transverse latches 24, 24. These latches extend laterally in opposite directions and overlie the corresponding extended handles 21 and have their under-margins provided with the respective notches as 25, to receive said handles and the other ends of the latches extend underneath the corresponding handles 21 and these ends are provided with the respective notches 26 to receive said handles 21. There are the pull springs 27, 27 attached at their upper ends to the outer ends of the latches 24, 24 and at their lower ends to the plate 7 and these pull springs 27 normally operate to hold said latches in position to maintain said handles 21, 21 seated in said corresponding notches 25, 26. The outer ends of the latches 24 also have the grips 28, 28 attached thereto and which project out forwardly through the space between the flange 18 and the front cover 19 and by means of which the outer ends of the latches may be lifted and the handles 21, 21 released from the notches 25, 26 thus releasing the said handles 21 to the pressure of the spring 22 whereby the levers 20 will be forced inwardly and will withdraw the dogs 13.

There is a rear coupling member designated generally by the numeral 29 which is attached to and depends from the forward end of the trailer framework 30. This coupling member 29 is pivoted to work on a transverse axis and is composed preferably of angle iron shaped to conform to the contour of and to fit closely about the marginal flanges 9 of the coupling member 6. The lower margin of the coupling member 29 has an outwardly extending flange forming a suitable base 31. The coupling member 29 has the oppositely disposed bearings 32, 32 arranged to register with the dogs 13 when said coupling members are brought into assembled or coinciding position and when in such position the outer ends of said dogs will project through said bearings 32 to couple said members together.

When the trailer is disconnected from the tractor its forward end may be supported by suitable foldable legs 33 which are pivoted at their upper ends to the trailer frame work.

When it is desired to couple the trailer to the tractor, said tractor is located in front of the trailer, and the handles 21, are moved inwardly and latched in the notches 25, 26 to permit the dogs 13 to project. The tractor is then run rearwardly and the apron 5 will run under the base 31 of the coupling member 29 and said base 31 will ride up onto the supporting plate 4 thereby elevating the front end of the trailer and causing the legs 33 to clear the ground and the upstanding flanges of the coupling 29 will embrace the corresponding upstanding flanges of the coupling member 6. As these coupling members move into nested or interfitting position, the forwardly diverging sides of the coupling member 29 will force the dogs 13 inwardly compressing the spring 14 and when said dogs come into alignment with the bearings 32 the spring 14 will force the dogs outwardly through said last mentioned bearings completing the coupling operation. The depending legs 33 may then be folded up against the frame of the trailer and there held by a suitable mechanism provided for the purpose.

When it is desired to uncouple the trailer from the tractor the legs 33 may be swung down into vertical position and the outer ends of the latches 24 elevated to release the handles 21, 21 and the spring 22 will thereupon operate to force the inner ends of the levers 20 inwardly overcoming the pressure of the spring 14 and withdrawing the dogs 13 from the bearings 32 and thus effecting the disconnection of the coupling members 6, 29. When the tractor moves forwardly the supporting plate 4 will ride out from under the base 31 permitting the forward end of the trailer to descend until it is supported by the legs 33.

The drawings and description disclose what is now considered to be a preferred form of the invention by way of illustration only, while the broad principle of the invention will be defined by the appended claims.

What I claim is:

1. A coupling device for connecting vehicles comprising coupling members carried by the coupled vehicles, said coupling members being shaped to nest, releasable means for interlocking said members together and including yieldably mounted dogs movable into active position to interlock said members and into inactive position to disconnect said members, means arranged to hold said dogs in said inactive position and including manually operable latches for releasably locking said holding means in position to permit said dogs to remain in said active position.

2. A coupling device for connecting vehicles comprising coupling members carried by the coupled vehicles, said coupling members being shaped to fit together, releasable interlocking devices movable into active position to interlock said coupling members and into inactive position to release said coupling members, means including a spring normally holding said interlocking members in inactive position, and manually operable latches for locking the holding means inactive to permit said interlocking means to move into active position.

3. A coupling device for connecting vehicles comprising coupling members carried by the coupled vehicles, said coupling members being shaped to fit together, releasable interlocking devices movable into active position to interlock said coupling members and movable into inactive position to release said coupling members, means including a yieldable member for holding said interlocking members in inactive position and means for locking the holding means inactive to permit said interlocking means to move into active position.

4. A coupling device for connecting vehicles comprising coupling members carried by the coupled vehicles, said coupling members being shaped to fit together, releasable interlocking devices movable into active position to interlock said coupling members and into inactive position to release said coupling members, means normally holding said interlocking members in inactive position, and manually operable latches for locking the holding means inactive to permit said interlocking means to move into active position, and means constantly tending to move said interlocking members into said active position.

5. A coupling member having interlocking devices movable into active and inactive positions, a holding device including manually controllable latches arranged to hold said interlocking devices in inactive position, means arranged to lock said holding device inactive to permit said interlocking devices to move to active position.

6. A coupling member having interlocking devices movable into active and inactive positions, a holding device arranged to hold said interlocking devices in inactive position, manually controllable means arranged to lock said holding device inactive to permit said interlocking devices to move to active position, and means for causing such last named movement.

7. A coupling member including a housing, interlocking dogs mounted therein and movable into active and inactive positions, a common yieldable member tending to hold said dogs in active position, a holding device operatively connected with the dogs and including a spring which is effective to overcome said yieldable member and to hold said dogs in inactive position and manually operable, releasable latches for rendering said holding device inactive to permit said dogs to move to active position.

8. A coupling member including a housing, interlocking dogs mounted therein and movable into active and inactive position, yieldable means normally tending to hold said dogs in said active position, pivotally mounted levers in the housing engageable with said dogs and formed with extended handles, yieldable means operating on said levers and effective to normally hold said dogs in inactive position and releasable latches engageable with said handles and effective when engaged to hold said levers inactive whereby said dogs are permitted to move to active position.

In testimony whereof I have signed my name to this specification.

WILLIAM C. NABORS.